United States Patent [19]

Vandenberg

[11] 3,885,528

[45] May 27, 1975

[54] RAPID EXIT MILKING BARN

[75] Inventor: Ben W. Vandenberg, Artesia, Calif.

[73] Assignees: August Vandenberg, Artesia; Andrew W. Vandenberg, Bellflower, both of Calif. ; part interest to each

[22] Filed: Feb. 14, 1974

[21] Appl. No.: 442,456

[52] U.S. Cl............................... 119/14.03; 119/27
[51] Int. Cl............................................... A01k 1/00
[58] Field of Search............................ 119/14.03, 27

[56] References Cited
UNITED STATES PATENTS

| | | | |
|---|---|---|---|
| 2,740,377 | 4/1956 | Duncan............................ | 119/14.03 |
| 2,969,039 | 1/1961 | Golay............................... | 119/14.03 |
| 3,301,215 | 1/1967 | Shakarian..................... | 119/14.03 X |
| 3,810,442 | 5/1974 | Jacobs et al..................... | 119/14.03 |

*Primary Examiner*—Hugh R. Chamblee
*Attorney, Agent, or Firm*—Mahoney, Schick & Cislo

[57] ABSTRACT

A milking barn construction which includes a plurality of milking stations for individual cows and primary ingress and egress means to said stations. A plurality of secondary egress means is provided which facilitates the rapid egress of the cows from the individual milking stations. The rapid egress means, in one embodiment of the invention, is constituted by gates communicating with alternate ones of said milking stations to permit the cows to egress rapidly from the individual milking stations.

1 Claim, 4 Drawing Figures

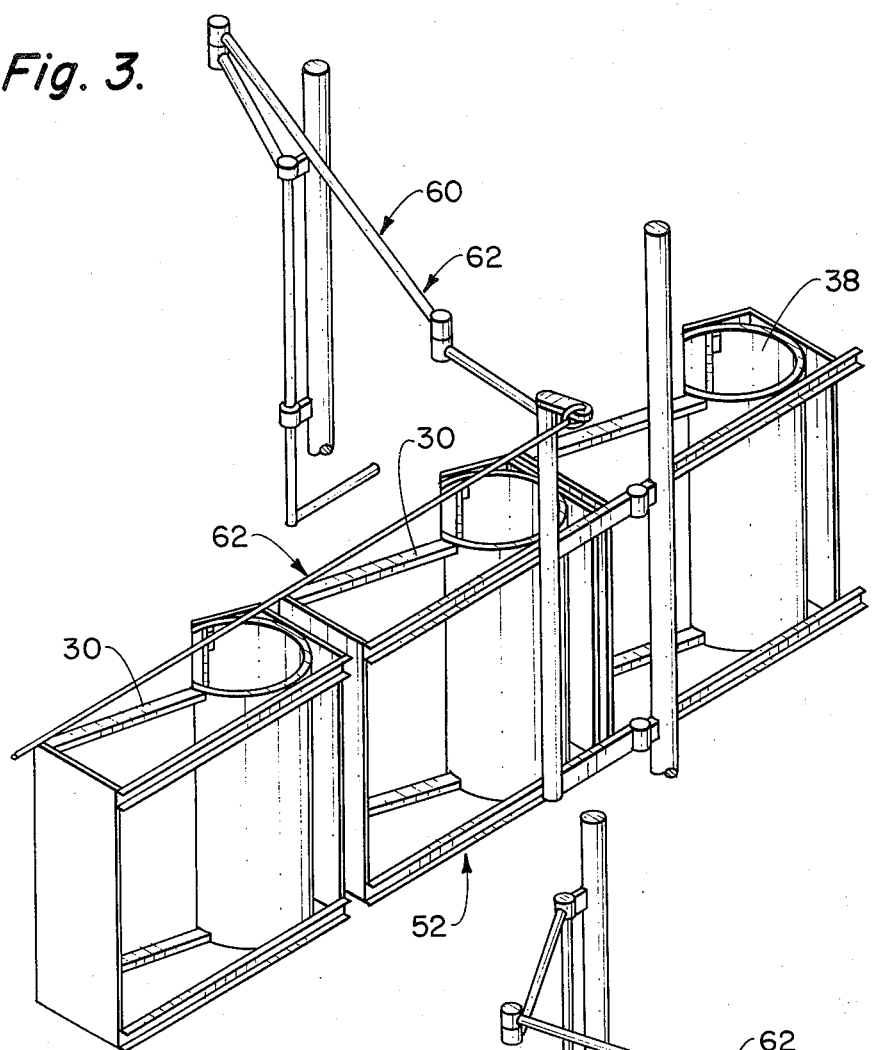
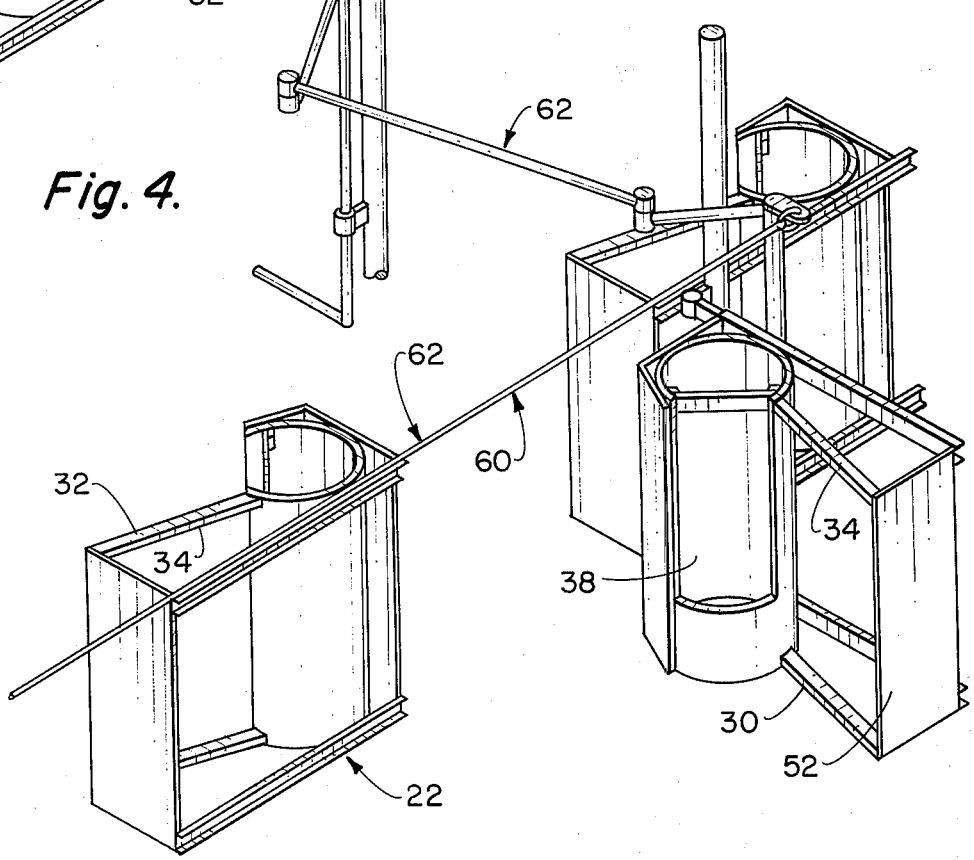

RAPID EXIT MILKING BARN

BACKGROUND OF THE INVENTION

The dairy industry is one of the major agricultural pursuits in the United States and provides many and various comestibles to the purchasing public. However, inflation has caused all of the elements involved in the production of the basic product, milk, to increase in cost so greatly as to necessitate the reduction of said cost to the greatest extent possible.

One of the major items involved in the production and processing of milk is the milking barn wherein a plurality of cows is simultaneously milked by automatic equipment to facilitate the most expeditious transfer of milk from the cows to the dairy where the milk is processed.

The capital investment in such milking barns is relatively large and dairy operations which include large numbers of cows must have milking facilities proportional to said number of cows. One of the major problems encountered with conventional dairy barns is the time consumed in introducing the cows into and leading them out of the milking barn when the milking process has been completed.

Obviously, the most desirable handling of cows to be milked is to lead them as rapidly as possible to the milking stations and to cause them to egress from the milking stations expeditiously and rapidly.

Numerous constructions designed to achieve this desired end have been contemplated in the prior art. Some of them involve the necessity for construction of specific types of buildings and are not adaptable to preexisting milking barn structures. Others involve capital expenditures which are prohibitive for the intermediate milk producer.

OBJECTS AND SUMMARY OF THE INVENTION

It is, therefore, an object of the invention to provide a rapid exit milking barn construction wherein the cows are introduced into the respective milking stations by the utilization of primary ingress means and wherein primary egress means is provided which is normally capable of communication with said primary ingress means. Interposed between the extremities of the primary egress means are secondary egress means of the invention which are adapted to facilitate the rapid movement of the cows from the individual milking stations into the primary egress means intermediate its extremities, thus eliminating the necessity for the single-file egress of the cows from the milking stations into the primary egress means as characteristic of conventional milking barns.

Another object of the invention is the provision of a rapid exit milking barn construction which can be incorporated into preexisting milking barns without radically modifying the building structure of the preexisting milking barns. Consequently, the necessity for completely rebuilding or initiating the building of milking barns is eliminated in view of the adaptability of the rapid exit construction to preexisting structures.

An additional object of the invention is the provision of a rapid exit milking barn construction wherein each of the milking stations is adapted to accommodate an individual cow and in which the milking stations are provided with front and rear restraining means adapted, respectively, to restrain the front and rear extremities of a cow during the milking operation. Associated with the front restraining means is the secondary egress means of the invention whereby the cows can be discharged directly from the milking stations into the primary egress means intermediate its extremities, thus eliminating the single-file debouchment of the cows from the milking stations into the primary egress means which is characteristic of conventional milking barn construction.

A further object of the invention is the provision of a rapid exit milking barn construction of the aforementioned character wherein the secondary egress means is constituted by a plurality of gates mounting the front restraining means of selected milking stations. In a preferred embodiment of the invention the front restraining means of alternate milking stations are provided with the gate construction, thus permitting the cow located at said gate to move immediately into the primary egress means intermediate its extremities and also permitting the adjacent cow to readily move through the open gate after the cow located adjacent the gate has entered the primary egress means.

Because of the substantial reduction in time achieved by the entry of the cows directly into the primary egress means intermediate its extremities, relatively rapid exit of the cows from the milking barn is accomplished. Consequently, the milking barn facility is capable of more intensive use than with prior art constructions wherein the exiting of the cows from the milking barn consumes as much or more time as the original entry of the cows into said barn.

Of course, concomitant with the rapid egress of the cows from the milking barn is a substantial reduction in the cost of labor entailed in the introduction of the cows into and the removal of the cows from the milking barn since the preexisting staff of workers is capable of handling a greater number of cows in the milking barn because of their rapid egress therefrom.

Other objects and advantages of the invention will be apparent from the following specification and the accompanying drawings.

BRIEF DESCRIPTION OF THE DRAWINGS

FIG. 3 is a fragmentary isometric view illustrating the secondary egress means in closed position; and FIG. 4 is a view similar to FIG. 3 showing one of the gates constituting the secondary egress means in open position.

Figure 1:
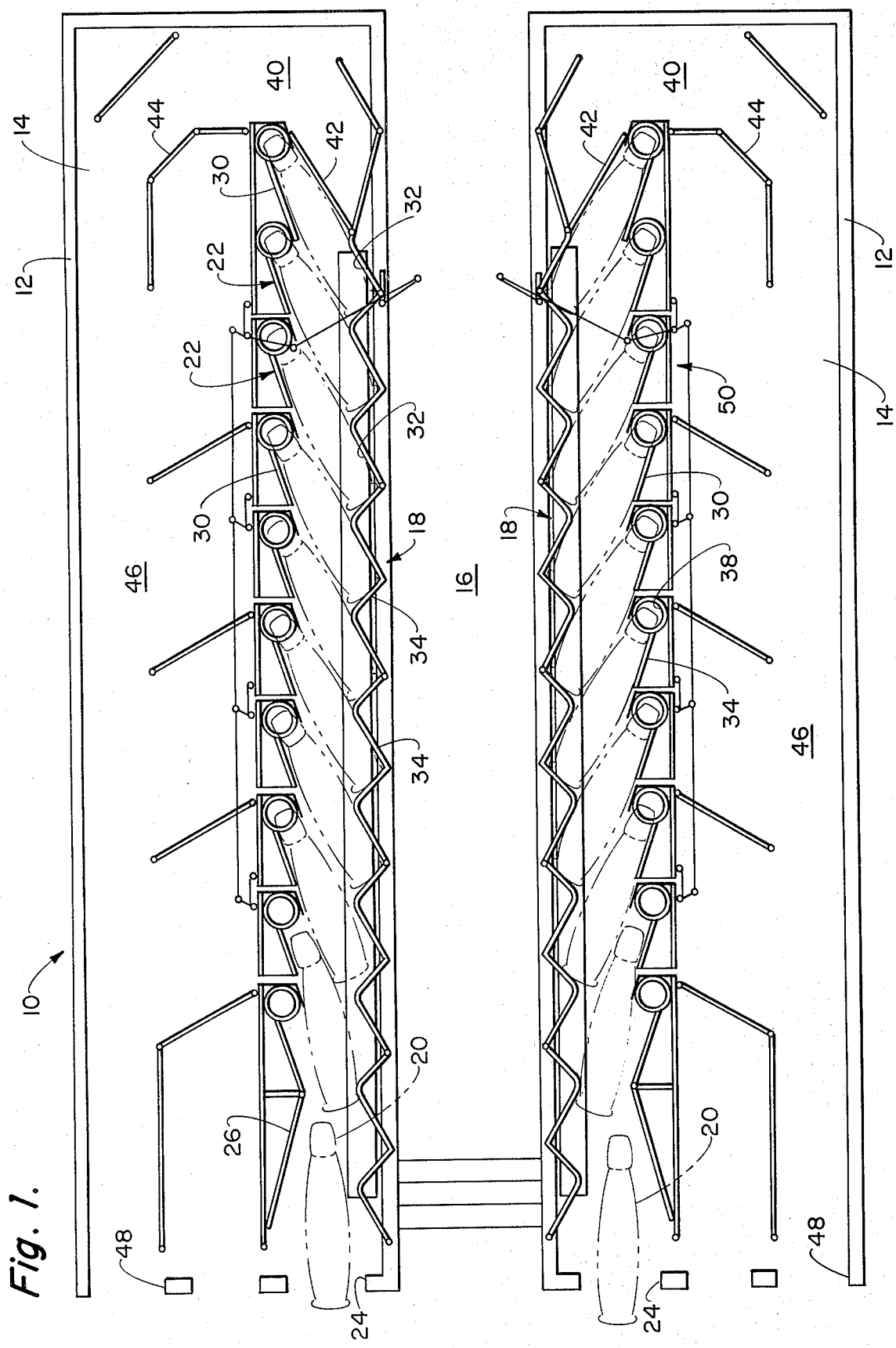
FIG. 1 is a top plan view of a milking barn incorporating the rapid exit construction of the invention.

DESCRIPTION OF THE BEST EMBODIMENTS CONTEMPLATED:

Referring to the drawings, and particularly to FIG. 1 thereof, I show a schematic depiction of a milking barn 10 which includes exterior walls 12 defining longitudinally extending, parallel bays 14. The bays 14 are aligned with an intermediate milking pit 16 and each of the bays incorporates milking structures generally indicated at 18 for receiving a plurality of cows 20 at individual milking stations 22.

Primary ingress means for the cows is constituted by a doorway 24 in the wall 12 of each of the milking bays 14, said door permitting, as best shown in FIG. 1 of the drawings, ingress of the cows 20 past an open gate 26 to the respective milking stations 22 where the forward extremity of each cow is restrained by forward restraining means 30 and the rear extremity by rear restraining means 32.

Figure 2:
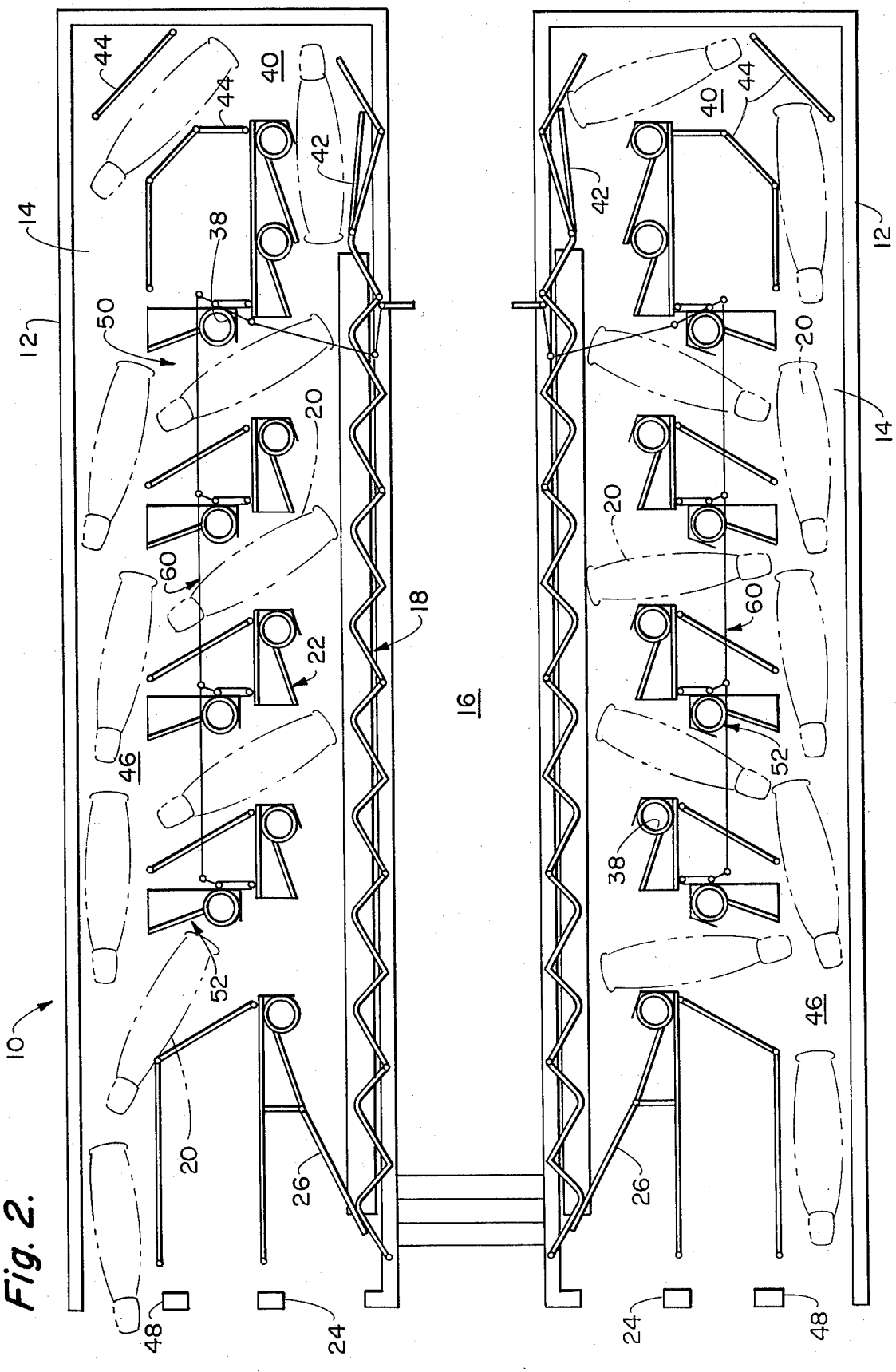
FIG. 2 is a top plan view similar to FIG. 1 and showing the manner in which the provision of secondary egress means characteristic of the invention permits the immediate egress of cows from the respective milking stations into the primary egress means intermediate the extremities thereof and thus reduces substantially the time involved in causing the cows to egress from the milking barn.

It will be noted that, as best shown in FIG. 1 of the drawings, when the individual cows 20 enter the primary egress means 24 which communicates with the individual milking stations 22 they are automatically aligned in angular parallel relationship with one another at the individual milking stations 22 because of the corresponding angularity of the various members 34 which constitute the front and rear restraining means at the milking stations. Once the cows have all entered the respective milking stations, the gates 26 which permit entry thereto are closed, as best shown in FIG. 2 of the drawings.

Also provided at the milking stations are feeders 38, as best shown in FIG. 1 – 4 of the drawings, adapted to receive any desired allotment of feed so that the cows can be fed during the milking process.

Communicating with the milking stations 22 is primary egress means 40 which is constituted by a gate 42, guide means 44 and an elongated egress passage 46 which communicates with an egress opening 48 in the wall of the building.

In conventional milking barn constructions all of the cows 20 must egress in single file past the open gate 42 into the primary egress means 40. They are guided into the elongated egress passage 46 by the guide means 44 and exit therefrom in single file through the exit opening 48 in the wall 12 of the respective milking bay 14. Because of the highly individual nature of each cow and because of the tendency of the cows to move slowly in single file through the primary ingress means of conventional structures, the ingress and egress of the cows from such conventional structures is a time-consuming and tedious process entailing the occupation of the milking barn by the cows long after the milking period has been terminated, thus entailing the tying up of a much-needed facility particularly where such facilities are expensive to operate and costly to erect.

In order to avoid this tedious and time-consuming conventional procedure for causing the egress of cows 20 from the milking barn 10, secondary egress means 50 of the invention is incorporated in the milking structures 18. The secondary egress means 50 is constituted by a plurality of gates 52, with said gates being provided upon the front restraining means 30 at alternate milking stations. The gates 52 are pivotally mounted to permit them to be moved between open and closed positions.

To facilitate opening of the gates 52 a common actuating means 60 constituted by a plurality of push and pull rods 62 is connected with the individual gates 52 which are included in the secondary egress means. The push and pull rods 62 are connected to a single actuating source which may be electrical or mechanical means or a simple manually operated lever but which, in any event, is adapted to cause the simultaneous opening of all of the gates 52 when actuated.

As can be readily determined from the showing in FIG. 2 of the drawings, when the gates 52 are simultaneously opened, the cows exit from the individual milking stations 22 directly into the egress passage 46 intermediate the extremities of the primary egress means 40. After the cows adjacent the gates 52 have exited, the cows in the adjacent stations will follow the previously exiting cow.

Therefore, the time consumed in the egress of the cows from the milking stations 22 is substantially reduced with consequent economies resulting from the greater utilization of the milking barn facility, since the time for exiting the cows may be reduced by as much as 200 percent.

Although I have shown and described a particular form of gate construction incorporated at the milking stations, it is, of course, conceivable that other types of gate constructions could be utilized to provide the secondary egress means. For instance, each of the gates could be hydraulically or electrically energized by motors connected directly to the gates and the gates, instead of pivoting outwardly, could be moved upwardly in the manner of an overhead garage door. Furthermore, the gates could be slid upwardly in suitable guide means by lifting mechanism attached thereto.

In any event, the provision of the secondary egress means greatly reduces the time consumed in the exiting of the cows from the milking stations and it greatly increases the availability of the milking barn for milking additional cows.

I claim:

1. In a milking barn for a plurality of cattle, the combination of: an elongated milking structure having primary ingress means and primary egrees means and incorporating a plurality of milking stations; front and rear cattle restraining means at each of said stations; and secondary egress means located between the extremities of said primary egress means and constituted by a plurality of movable gate portions in said front restraining means to permit said cattle to debouch directly into said primary egress means intermediate its extremities, said gate portions being provided at alternate ones of said milking stations to permit said cattle to debouch in pairs from said alternate stations; and common actuating means secured to said gates to permit said gate portions to be simultaneously actuated to prevent or permit egress from said milking stations.

* * * * *